United States Patent
Kama et al.

(10) Patent No.: US 10,343,740 B2
(45) Date of Patent: Jul. 9, 2019

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Mori, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 115 days.

(21) Appl. No.: 15/695,068

(22) Filed: Sep. 5, 2017

(65) Prior Publication Data
US 2018/0072366 A1    Mar. 15, 2018

(30) Foreign Application Priority Data

Sep. 13, 2016 (JP) .................................. 2016-178983

(51) Int. Cl.
*B62J 99/00* (2009.01)
*B62K 11/00* (2006.01)
(Continued)

(52) U.S. Cl.
CPC ............ *B62K 11/007* (2016.11); *B62K 3/002* (2013.01); *B62K 5/02* (2013.01); *B62K 15/006* (2013.01); *B62K 23/00* (2013.01); *B62K 23/04* (2013.01); *B62L 3/00* (2013.01); *B62J 2099/002* (2013.01); *B62K 2204/00* (2013.01)

(58) Field of Classification Search
CPC ........ B62K 11/007; B62K 3/002; B62K 5/02; B62K 15/006; B62J 2099/002
See application file for complete search history.

(56) References Cited

U.S. PATENT DOCUMENTS 6,288,505 B1 * 9/2001 Heinzmann ............ A63C 17/12
  180/181
6,408,240 B1 * 6/2002 Morrell .................. A63C 17/12
  180/197
(Continued)

FOREIGN PATENT DOCUMENTS

JP      01-106717 A    4/1989
JP    2005-231415 A    9/2005
(Continued)

*Primary Examiner* — Kevin Hurley
*Assistant Examiner* — Gabriela C Craciun
(74) *Attorney, Agent, or Firm* — Sughrue Mion, PLLC

(57) ABSTRACT

Provided is a traveling apparatus including a front wheel supporting member configured to rotatably support a front wheel; a rear wheel supporting member configured to rotatably support a rear wheel; a driving unit configured to drive at least one of the front wheel and rear wheel; an adjusting mechanism configured to adjust a wheel base length between the front wheel and the rear wheel by a user changing relative positions of the front wheel supporting member and the rear wheel supporting member; a control unit configured to control the driving unit based on a target speed associated with the wheel base length; and a failure detection unit configured to detect a failure in the traveling apparatus. When the failure detection unit detects the failure, the control unit stops the control based on the target speed associated with the wheel base length and performs control to extend the wheel base length.

7 Claims, 15 Drawing Sheets

(51) Int. Cl.
*B62K 15/00* (2006.01)
*B62K 23/00* (2006.01)
*B62L 3/00* (2006.01)
*B62K 3/00* (2006.01)
*B62K 5/02* (2013.01)
*B62K 23/04* (2006.01)

(56) References Cited

U.S. PATENT DOCUMENTS

| | | | | |
|---|---|---|---|---|
| 6,538,411 | B1 * | 3/2003 | Field | A63C 17/12 180/218 |
| 6,581,714 | B1 * | 6/2003 | Kamen | A63C 17/12 180/19.1 |
| 7,717,200 | B2 * | 5/2010 | Kakinuma | A63C 17/08 180/218 |
| 9,010,474 | B2 * | 4/2015 | Martinelli | B62D 51/02 180/218 |
| D746,928 | S * | 1/2016 | Doerksen | D21/765 |
| 9,862,434 | B2 * | 1/2018 | Radenbaugh | B62D 51/02 |
| 2008/0116665 | A1 | 5/2008 | Nakaizumi et al. | |
| 2012/0101703 | A1 | 4/2012 | Morita | |
| 2013/0277941 | A1 * | 10/2013 | Ryan | B62K 15/006 280/278 |
| 2014/0008138 | A1 | 1/2014 | Kim et al. | |
| 2016/0083024 | A1 * | 3/2016 | Mori | B62D 51/001 701/70 |
| 2019/0009854 | A1 * | 1/2019 | Bao | B62K 3/00 |

FOREIGN PATENT DOCUMENTS

| | | | |
|---|---|---|---|
| JP | 2007269316 A | 10/2007 | |
| JP | 2010-167809 A | 8/2010 | |
| JP | 2011031636 A | 2/2011 | |
| JP | 5316640 B2 | 10/2013 | |
| JP | 2018043607 A * | 3/2018 | B62K 11/007 |

\* cited by examiner

| ROTATION ANGLE θ (DEGREE) | $\theta_{MIN} - \theta_1$ | $\theta_1 - \theta_2$ | $\theta_2 - \theta_3$ | $\theta_3 - \theta_{MAX}$ |
|---|---|---|---|---|
| TARGET SPEED (km/h) | 0 | 5.0 | 10.0 | 15.0 |

US 10,343,740 B2

TRAVELING APPARATUS

CROSS REFERENCE TO RELATED APPLICATIONS

This application is based upon and claims the benefit of priority from Japanese patent application No. 2016-178983, filed on Sep. 13, 2016, the disclosure of which is incorporated herein in its entirety by reference.

BACKGROUND

Nowadays, personal mobility vehicles have been attracting attention. A personal mobility vehicle is often manufactured in a small size in view of maneuverability, which raises a problem that it lacks stability when traveling at a high speed. In order to improve stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

It is difficult for personal mobility vehicles to employ a vehicle body structure that wraps around occupants in order to prevent the occupants from being thrown out of the vehicles. It is desired that personal mobility vehicles exert good maneuverability when traveling at a low speed and stability when traveling at a high speed during normal traveling, that they can promptly stop, and that they enable occupants to safely get off the vehicles without losing their balance.

The present invention has been made to solve such a problem, and provides a traveling apparatus capable of adjusting a wheel base length that enables an occupant to easily maintain his/her balance and safely get off the vehicle even when a failure occurs.

In an example aspect of the present invention, a traveling apparatus includes at least, with respect to a traveling direction, a front wheel and a rear wheel and on which a user rides when traveling. The traveling apparatus includes: a front wheel supporting member configured to rotatably support the front wheel; a rear wheel supporting member configured to rotatably support the rear wheel; a driving unit configured to drive at least one of the front wheel and the rear wheel; an adjusting mechanism configured to adjust a wheel base length between the front wheel and the rear wheel by the user changing relative positions of the front wheel supporting member and the rear wheel supporting member; a control unit configured to control the driving unit based on a target speed associated with the wheel base length; and a failure detection unit configured to detect a failure in the traveling apparatus. When the failure detection unit detects the failure, the control unit stops the control based on the target speed associated with the wheel base length and performs control to extend the wheel base length.

With the above-described configuration, during normal traveling, the wheel base length is extended and the traveling apparatus travels at a high speed, and when a failure is detected, the speed can be promptly reduced while extending the wheel base length so that the user can maintain his/her balance.

According to the present invention, it is possible to provide a traveling apparatus capable of adjusting a wheel base length that enables an occupant to easily maintain his/her balance and safely get off the vehicle even when a failure occurs.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, although the present invention will be described with reference to embodiments of the invention, the invention according to claims is not limited to the following embodiments. Moreover, all the components described in the following embodiments are not necessarily indispensable for means to solve problems.

Figure 1:
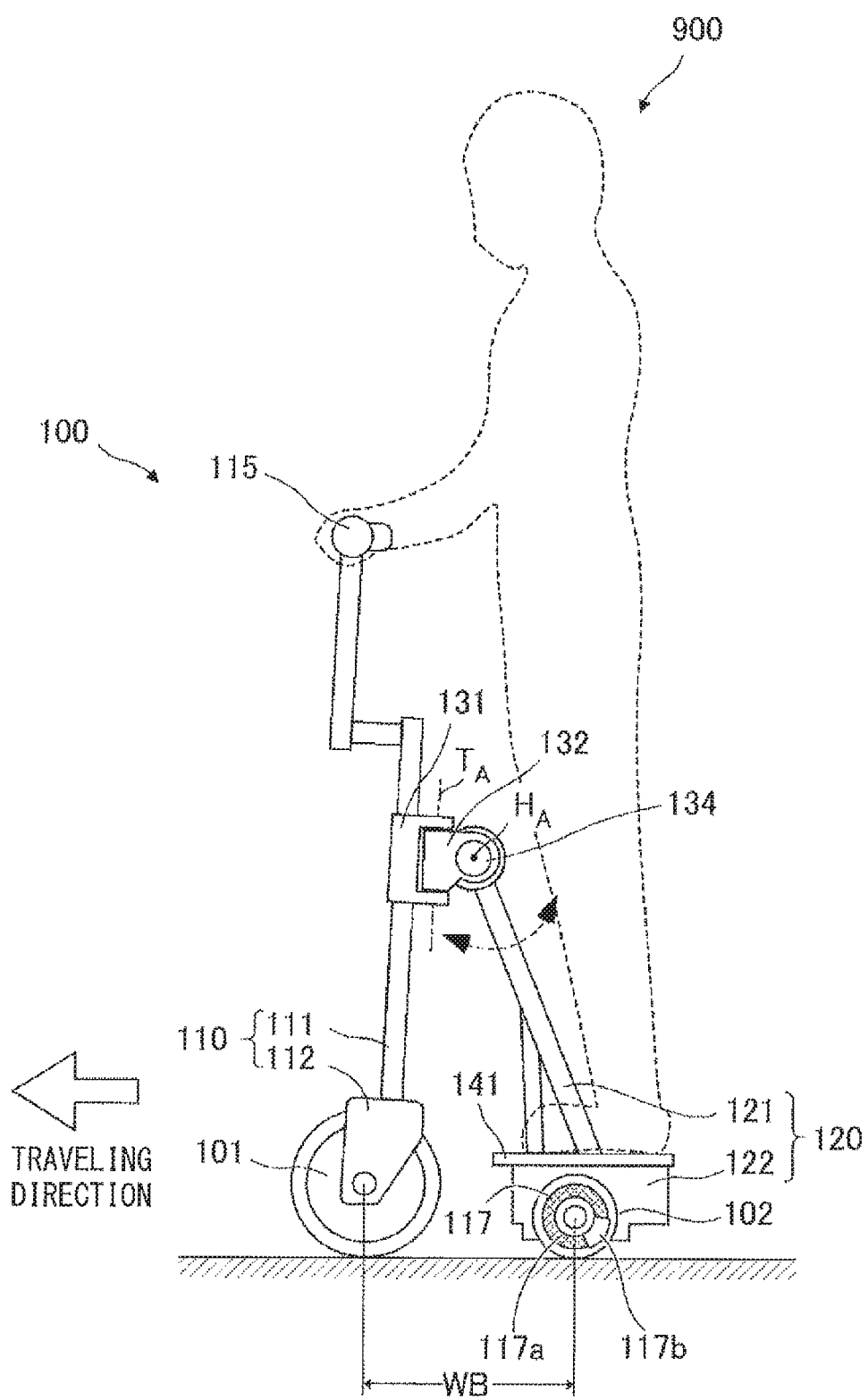
FIG. 1 is a lateral overview diagram of a traveling apparatus according to a first embodiment when it travels at a low speed.
Figure 2:
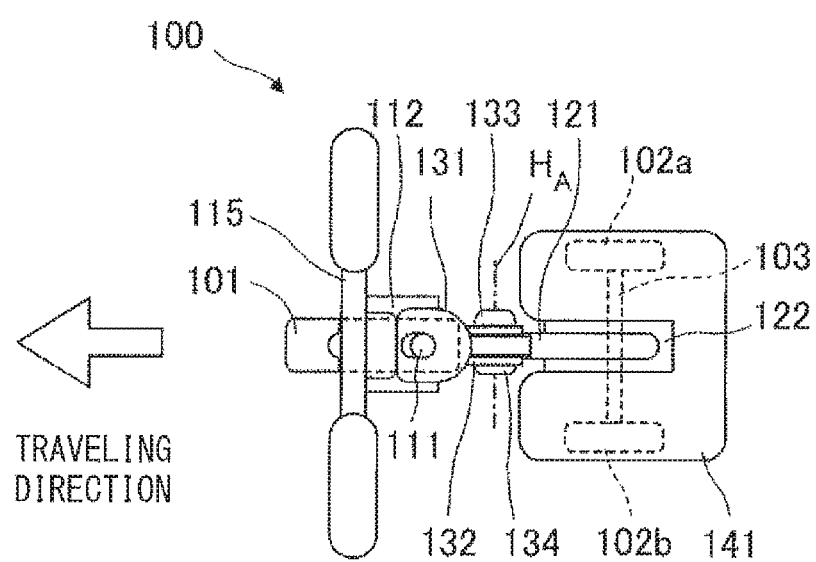
FIG. 2 is a top overview diagram of the traveling apparatus.

A first embodiment will be described below. FIG. 1 is a lateral overview diagram of a traveling apparatus 100 according to the first embodiment when it travels at a low speed. FIG. 2 is a top lateral diagram as viewed from above the traveling apparatus 100 that is in the state shown in FIG. 1. In FIG. 2, a user 900, who is illustrated by the dotted line in FIG. 1, is not shown.

The traveling apparatus 100 is one kind of personal mobility vehicle and is an electrically operated mobile vehicle in which a user stands when he or she rides on the traveling apparatus 100. The traveling apparatus 100 includes, with respect to the traveling direction, one front wheel 101 and two rear wheels 102 (right rear wheel 102a and left rear wheel 102b). An orientation of the front wheel 101 is changed when the user 900 operates a handlebar 115. The front wheel 101 functions as a steering wheel. The right rear wheel 102a and left rear wheel 102b are coupled by a wheel axis 103 and driven by a motor and a deceleration mechanism (not shown). The right rear wheel 102a and the left rear wheel 102b function as driving wheels. The traveling apparatus 100 is grounded at three points by the three wheels and is a statically stable vehicle that is self-supported even when the traveling apparatus 100 is parked without the user 900 riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user 900 turns the handlebar 115, the front pole 111 transmits a force of the operation to the front wheel 101 to change its orientation.

The rear wheels 102 are rotatably supported by a rear wheel supporting member 120. The rear wheel supporting member 120 includes a rear pole 121 and a body part 122. The body part 122 fixes and supports one end of the rear pole 121 and rotatably supports the right rear wheel 102a and left rear wheel 102b with the wheel axis 103 interposed between the right rear wheel 102a and left rear wheel 102b. The body part 122 also functions as a housing that accommodates the above-mentioned motor and deceleration mechanism, and a battery etc. that supplies power to the motor. A step 141, for the user 900 to place his/her feet on, is provided on the upper surface of the body part 122. The step 141 and body part 122 constitute a riding part.

The rear wheels 102 include a disk brake 117 as a braking member that brakes rotation of the rear wheels 102. In the disk brake 117, a brake pad 117b sandwiches a disk 117a attached to the inside of the wheel to generate friction in response to a brake signal from a control unit, thereby reducing a rotation speed of the rear wheel 102.

The front wheel supporting member 110 and rear wheel supporting member 120 are coupled to each other with a pivot joint 131 and a hinge joint 132 interposed therebetween. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis $H_A$, which is disposed parallel to the direction in which the wheel axis 103 is extended.

With such a structure, when the user 900 turns the handlebar 115, the front wheel supporting member 110 revolves around the pivot axis $T_A$ with respect to the rear wheel supporting member 120, so that the orientation of the front wheel 101 can be changed. Moreover, when the user 900 tilts the handlebar 115 forward in the traveling direction, the front wheel supporting member 110 and rear wheel supporting member 120 rotate in relation to each other around the hinge axis $H_A$, so that an angle formed by the front pole 111 and rear pole 121 can be made smaller. When the angle formed by the front pole 111 and rear pole 121 is made small, a WB length, which is a distance of a wheel base (WB) between the front wheel 101 and rear wheels 102 will become shorter. On the contrary, when the user 900 tilts the handlebar 115 backward in the traveling direction, the front wheel supporting member 110 and rear wheel supporting member 120 rotate in relation to each other around the hinge axis $H_A$, so that the angle formed by the front pole 111 and rear pole 121 can be made larger. When the angle formed by the front pole 111 and rear pole 121 increases, the WB length increases. That is, the user 900 can reduce or increase the WB length by performing an operation as a rotation force.

A biasing spring 133 is attached to around the hinge joint 132. The biasing spring 133 exerts a biasing force on the hinge axis $H_A$ in the rotation direction that reduces the angle formed by the front pole 111 and rear pole 121. The biasing spring 133 is, for example, a torsion spring. The biasing force of the biasing spring 133 changes the angle formed by the front pole 111 and rear pole 121 to be structurally the smallest angle when the user 900 is not in contact with the handlebar 115. On the other hand, the biasing force of the biasing spring 133 is configured in such a degree as to enable the user 900 to easily tilt the handlebar 115 backward in the traveling direction. Accordingly, the user 900 can adjust the angle formed by the front pole 111 and rear pole 121 and thus the WB length by changing at least one of a weight on the handlebar 115 and a weight on the step 141. That is, a mechanism for connecting the front pole 111 to the rear pole 121 with the hinge joint 132 interposed therebetween functions as an adjusting mechanism for the user 900 to adjust the WB length.

A rotation angle sensor 134 is attached to around the hinge joint 132. The rotation angle sensor 134 outputs the angle formed by the front pole 111 and rear pole 121 around the hinge axis $H_A$. That is, the rotation angle sensor 134 functions as a measuring unit for measuring relative positions of the front wheel supporting member 110 and rear wheel supporting member 120. The rotation angle sensor 134 is, for example, a rotary encoder. An output from the rotation angle sensor 134 is sent to a control unit, which will be described later.

Figure 3:
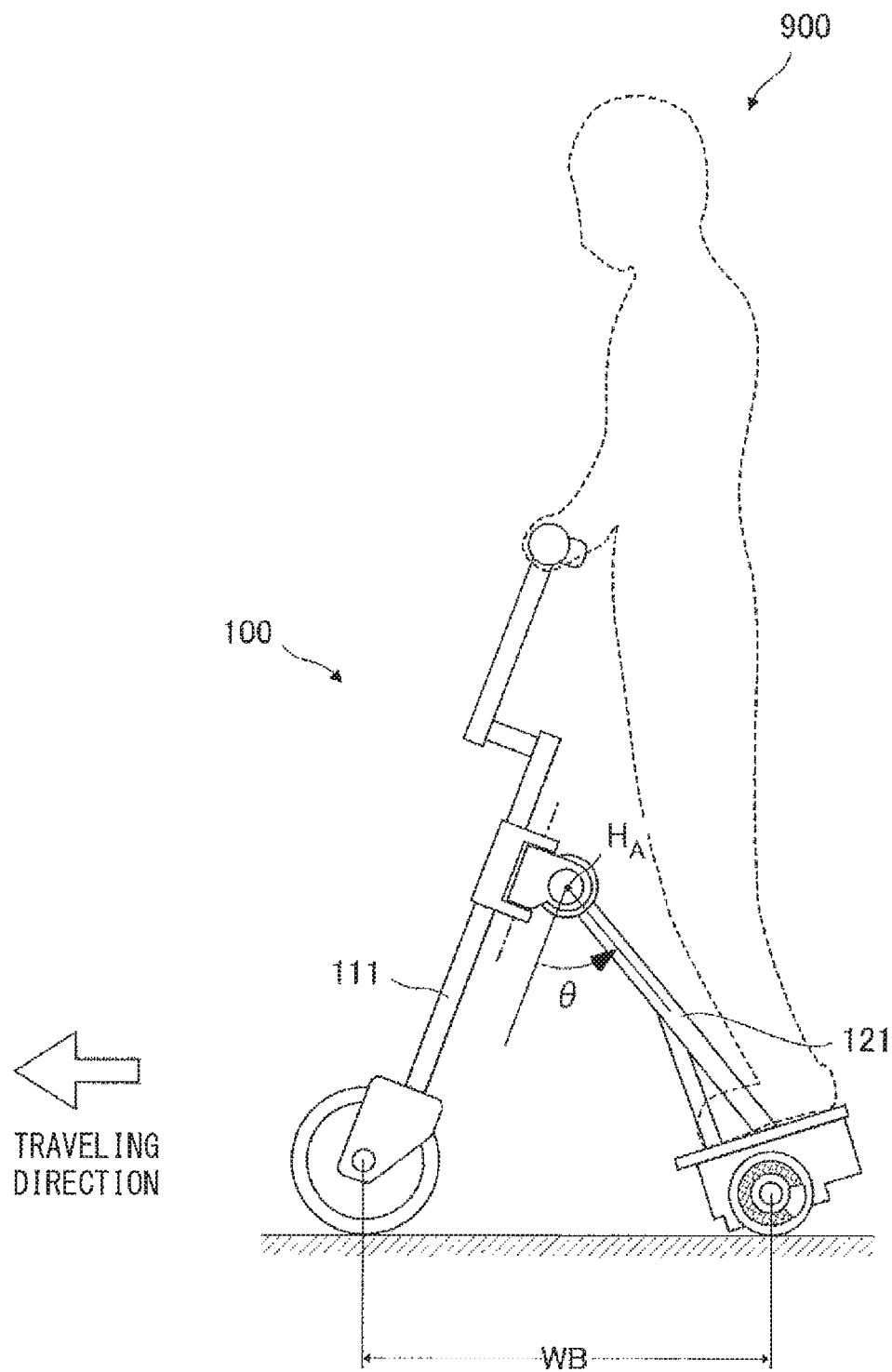
FIG. 3 is a lateral overview diagram of the traveling apparatus when it travels at a high speed.

During the normal traveling, the traveling apparatus 100 travels at a low speed when the WB length is short and travels at a high speed when the WB length is long. FIG. 1 shows a state of the traveling apparatus 100 with a short WB length traveling at a low speed. FIG. 3 is a lateral overview diagram of the traveling apparatus 100 shown in FIG. 1 and shows a state of the traveling apparatus 100 with a long WB length traveling at a high speed.

As shown in the drawings, a direction in which the angle formed by the front pole 111 and rear pole 121 relatively increases shall be positive, and a rotation angle shall be θ. Further, a minimum value the rotation angle θ can take (minimum angle) shall be $\theta_{MIN}$, and a maximum value the rotation angle θ can take (maximum angle) shall be $\theta_{MAX}$. For example, $\theta_{MIN}$ is 10 degrees, and $\theta_{MAX}$ is 80 degrees. In other words, a structural control member is provided so that the rotation angle θ falls within a range between $\theta_{MIN}$ and $\theta_{MAX}$.

The WB length corresponds one-to-one to the rotation angle θ and can be calculated by the function, WB length=f(θ). Therefore, the WB length can be adjusted by changing the rotation angle θ. During the normal traveling, the traveling apparatus 100 accelerates when the user 900 increases the rotation angle θ and decelerates when the user 900 reduces the rotation angle θ. That is, the target speed is associated with the rotation angle θ, and a change in the rotation angle θ causes the traveling apparatus 100 to accelerate/decelerate in order to reach the target speed associated with the changed rotation angle θ. In other words, the rotation angle θ is used as a parameter to associate the WB length with the target speed, and when the user 900 adjusts the WB length, the target speed is changed according to the adjusted WB length.

During the normal traveling where the WB length is adjusted in order to adjust the speed by the user 900 tilting the handlebar 115 or shifting his/her weight, when the rotation angle θ is reduced, the WB length becomes shorter and thus the traveling apparatus 100 travels at a low speed. Thus, the traveling apparatus 100 is maneuverable during the normal traveling. That is, the traveling apparatus 100 can move around in a small space. On the contrary, when the rotation angle θ is increased, the WB length becomes longer, thereby improving travel stability, in particular, straight drivability. That is, the traveling apparatus 100 is less susceptible to sway caused by bumps and the like on the road even when traveling at a high speed. As the WB length is changed in conjunction with a change in the speed, the WB length will not be long when the traveling apparatus 100 is traveling at a low speed, and thus the traveling apparatus 100 can move in a projected area minimal at the low speed. That is, an area on the road necessary for the traveling apparatus 100 to travel in is small without requiring an excess area. As the user 900 can change both the speed and WB length in conjunction with each other when he or she performs an intuitive operation such as tilting the handlebar 115 forward and backward, the driving operation is easy and simple.

Figure 4:
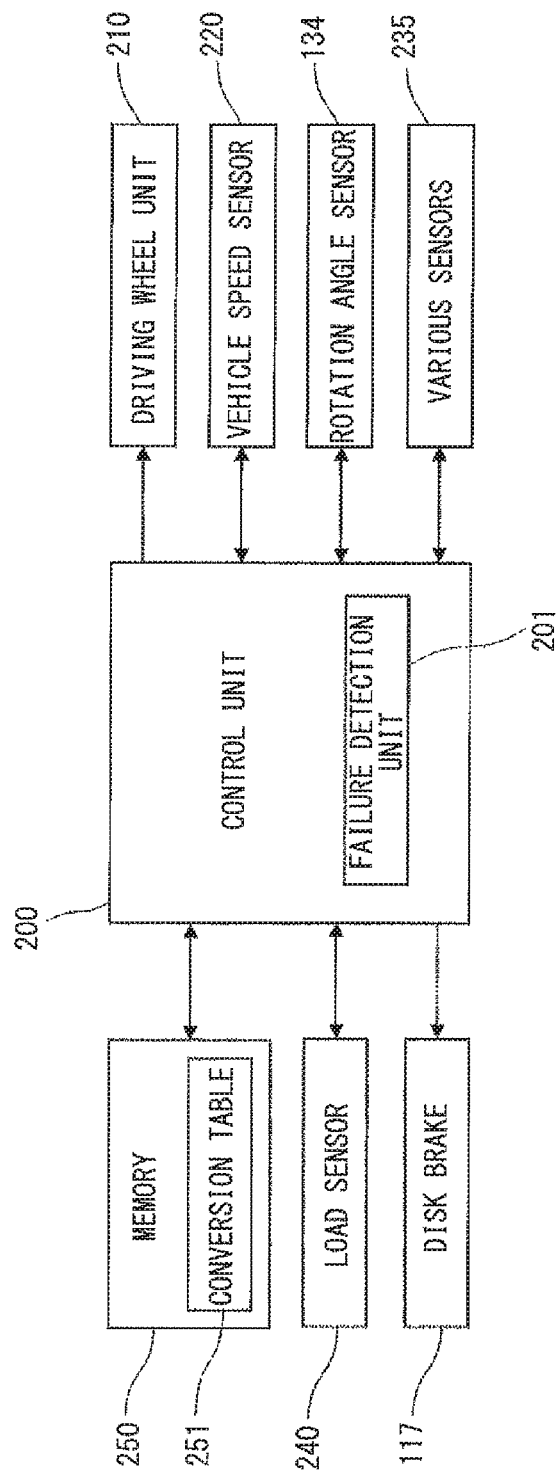
FIG. 4 is a control block diagram of the traveling apparatus.

FIG. 4 is a control block diagram of the traveling apparatus 100. A control unit 200 is, for example, a CPU and accommodated inside the body part 122. A driving wheel unit 210 includes a driving circuit and a motor for driving the rear 102, which are driving wheels. The driving wheel unit 210 is accommodated inside the body part 122. The control unit 200 sends driving signals to the driving wheel unit 210 to thereby control the rotations of the rear wheels 102.

The vehicle speed sensor 220 monitors an amount of the rotation of the rear wheels 102 or wheel axis 103 and detects the speed of the traveling apparatus 100. In response to a request from the control unit 200, the vehicle speed sensor 220 sends a result of the detection in a speed signal to the control unit 200. The rotation angle sensor 134 detects the rotation angle θ in the manner described above. In response to a request from the control unit 200, the rotation angle sensor 134 sends a result of the detection in a rotation angle signal to the control unit 200.

Various sensors 235 are a group of sensors that monitor as to whether or not an abnormality has occurred in states of various elements constituting the traveling apparatus 100 or in responses to commands. The various sensors 235 send a result of the detection to the control unit in response to a request from the control unit 200 or periodically. The various sensors 235 are, for example, a temperature sensor of the battery and a current sensor of the motor.

The disc brake 117 reduces the rotation of the rear wheels 102 by a frictional force. The control unit 200 sends the brake signal to the disc brake 117 to control a start of the braking and increase/decrease of the frictional force.

A load sensor 240 is, for example, a piezoelectric film that detects a load applied on the step 141, and is embedded in the step 141.

In response to a request from the control unit 200, the load sensor 240 sends a result of the detection in a load signal to the control unit 200.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting a rotation angle into a target speed.

The control unit 200 plays a role as a failure detection unit 201. The failure detection unit 201 analyzes information obtained from the vehicle speed sensor 220, rotation angle sensor 134, various sensors 235, and load sensor 240 to detect a failure in the traveling apparatus 100. Specific processing will be described later.

Figures 5, 6:
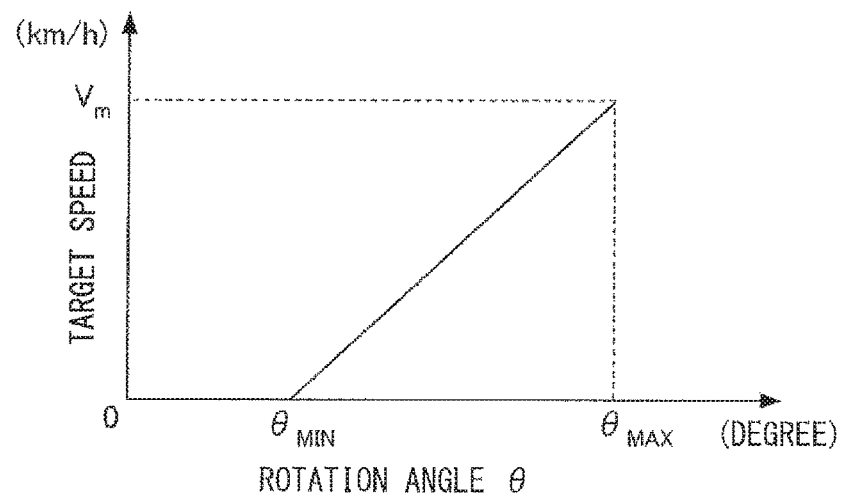
FIG. 5 is a graph showing a relationship between a rotation angle and a target speed.
FIG. 6 is a table showing a relationship between the rotation angle and target speed according to another example.

FIG. 5 is a graph showing a relationship between the rotation angle θ and target speed as an example of the conversion table 251 for converting a rotation angle θ into a target speed. In FIG. 5, the horizontal axis represents the rotation angle θ (degrees), and the vertical axis represents the target speed (km/h). As shown in FIG. 5, the target speed is expressed as a linear function of the rotation angle θ. The target speed is configured to become greater as the rotation angle θ increases. The target speed is zero at the minimum angle $\theta_{MIN}$ (degree), and the target speed is $V_m$ (km/h) at the maximum angle $\theta_{MAX}$ (degree). In this way, the conversion table 251 may be in the form of a function.

FIG. 6 is a table showing a relationship between the rotation angle θ and the target speed as another example of the conversion table 251 for converting a rotation angle θ into a target speed. In the example of FIG. 5, the continuously varying target speed is associated with the continuously varying rotation angle θ. In the example of FIG. 6, the continuously varying rotation angle θ is divided into a plurality of groups, and one target speed is associated with each group.

As shown in FIG. 6, the target speed 0 (km/h) is associated with the group of rotation angle θ in the range between $\theta_{MIN}$ or greater and less than $\theta_1$, the target speed 5.0 (km/h) is associated with the group of rotation angle θ in the range between $\theta_1$ or greater and less than $\theta_2$, the target speed 10.0 (km/h) is associated with the group of rotation angle θ in the range between $\theta_2$ or greater and less than $\theta_3$, and the target speed 15.0 (km/h) is associated with the group of rotation angle θ in the range between $\theta_3$ or greater and less than $\theta_{MAX}$ The conversion table 251 in this case can employ the lookup table format. Like in the above example, when the target speed is associated with a somewhat broad range of the rotation angles θ, the target speed will not change little by little, for example, as a result of being affected by swinging of the user 900's body, and it is thus expected that the speed will be smoothly changed. It is obvious that hysteresis may be included in the boundaries between the ranges of the above rotation angles, and by setting different boundaries of the ranges of these angles at the time of acceleration and deceleration, it is expected that the speed will be changed more smoothly.

The association between the rotation angle θ and target speed is not limited to the examples of FIGS. 5 and 6, and various other associations may be formed. As an example of the association, the amount of a change in the target speed for the amount of a change in the rotation angle θ may be configured to be small in a low-speed region, while the amount of a change in the target speed for the amount of a change in the rotation angle θ may be configured to be large in a high-speed region. Moreover, in this embodiment, although the conversion table 251 for associating the rotation angle θ, which is a parameter, with the target speed because the rotation angle θ corresponds one-to-one to the WB length is employed, a conversion table for associating the WB length with the target speed may be employed instead. In this case, a rotation angle θ obtained by the rotation angle sensor 134 may be converted into a WB length by using the above function, and the conversion table may be referred to.

Figure 7:
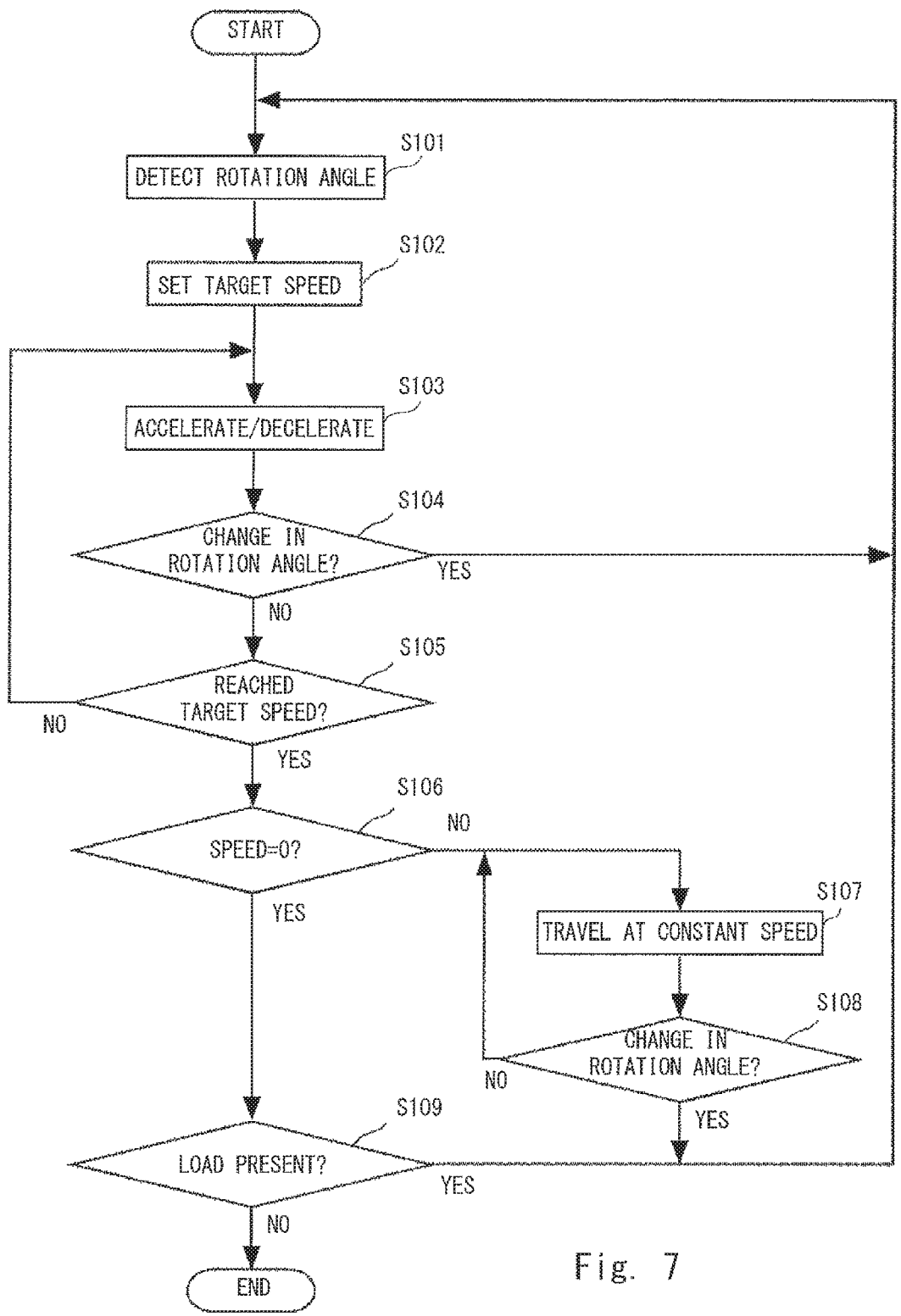
FIG. 7 is a flowchart showing a process while the traveling apparatus is normally traveling.

Next, a normal traveling process according to this embodiment will be described. FIG. 7 is a flowchart showing a process performed while the traveling apparatus 100 is normally traveling. The flow starts when a power switch is turned on and a signal indicating that a load is present is received from the load sensor 240, i.e., when the user 900 rides on the traveling apparatus 100.

In Step S101, the control unit 200 obtains the rotation angle signal from the rotation angle sensor 134 and calculates the current rotation angle θ. In Step S102, the calculated rotation angle θ is applied to the conversion table 251, which has been read out from the memory 250, to set the target speed.

When the control unit 200 sets the target speed, it proceeds to Step S103 and sends a driving signal for acceleration or deceleration to the driving wheel unit 210. Specifically, the control unit 200 firstly receives the speed signal from the vehicle speed sensor 220 and checks the current speed. If the target speed is greater than the current speed, the control unit 200 sends the driving signal for acceleration to the driving wheel unit 210, whereas if the target speed is less than the current speed, the control unit 200 sends the driving signal for deceleration to the driving wheel unit 210.

The control unit 200 monitors whether or not the rotation angle θ has changed during acceleration or deceleration, that is, whether or not the user 900 has tilted the handlebar 115 forward or backward (Step S104). If the control unit 200 determines that the rotation angle θ has changed, it starts the process from Step S101 again. If the control unit 200 determines that the rotation angle θ has not changed, it proceeds to Step S105. Note that when the conversion table shown in FIG. 6 is employed, if changes in the rotation angle θ are within one range, it is determined that the rotation angle θ has not changed.

In Step S105, the control unit 200 receives the speed signal from the vehicle speed sensor 220 and evaluates as to whether or not the current speed has reached the target speed. If the control unit 200 determines that the current speed has not reached the target speed, it returns to Step S103, and the acceleration or deceleration is continued. If the control unit 200 determines that the current speed has reached the target speed, it proceeds to Step S106. In Step S106, the control unit 200 checks whether or not the target speed is zero. If the target speed is zero, it means that the traveling apparatus 100 is stopped at the time of Step S106. Otherwise, the traveling apparatus 100 is traveling at the target speed, and thus the control unit 200 sends, to the driving wheel unit 210, the driving signal for maintaining the traveling apparatus 100 to travel at the speed (Step S107).

Even while the traveling apparatus 100 is traveling at a constant speed in Step S107, the control unit 200 monitors whether or not the rotation angle θ has changed, that is, whether or not the user 900 has tilted the handlebar 115 forward or backward (Step S108). If the control unit 200 determines that the rotation angle θ has changed, it returns to Step S101. If the control unit 200 determines that the rotation angle θ has not changed, it returns to Step S107 to continue traveling at the constant speed.

If the control unit 200 confirms that the target speed is zero in Step S106, it proceeds to Step S109 and evaluates whether the user 900 gets off the traveling apparatus 100 based on the load signal received from the load sensor 240. If the control unit 200 determines that the user 900 has not got off the traveling apparatus 100, i.e., determines that a load is present, it returns to Step S101 to continue the travel control. If the control unit 200 determines that the user 900 has got off the traveling apparatus 100, the series of operations is ended.

During the normal traveling described with reference to FIG. 7, it is difficult to predict when a failure will occur in the traveling apparatus 100. On the other hand, in light of the nature of the traveling apparatus 100 on which the user 900 rides and that travels, it is desirable to promptly and safely stop the traveling apparatus 100 when a failure occurs. Thus, the traveling apparatus 100 according to this embodiment executes an interrupt process for periodically monitoring whether or not a failure has occurred during the normal traveling shown in FIG. 7, and for promptly and safely stopping the traveling apparatus 100 when a failure is detected.

Figure 8A:
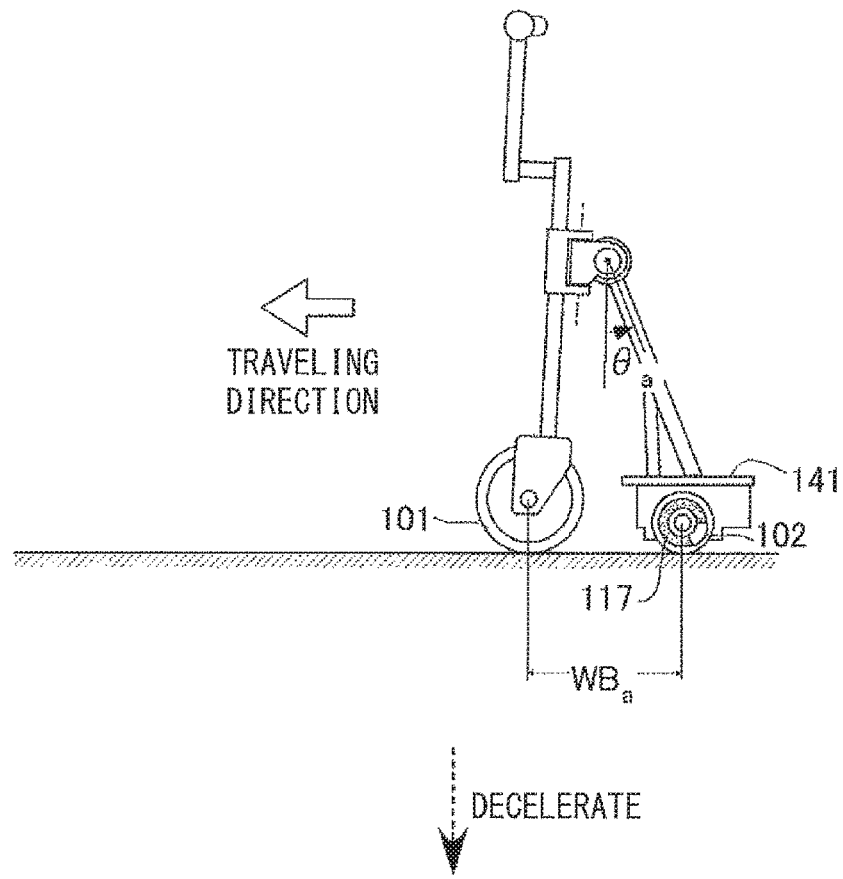
FIGS. 8A and 8B are drawings for describing a behavior of the traveling apparatus when a failure occurs.
Figure 8B:
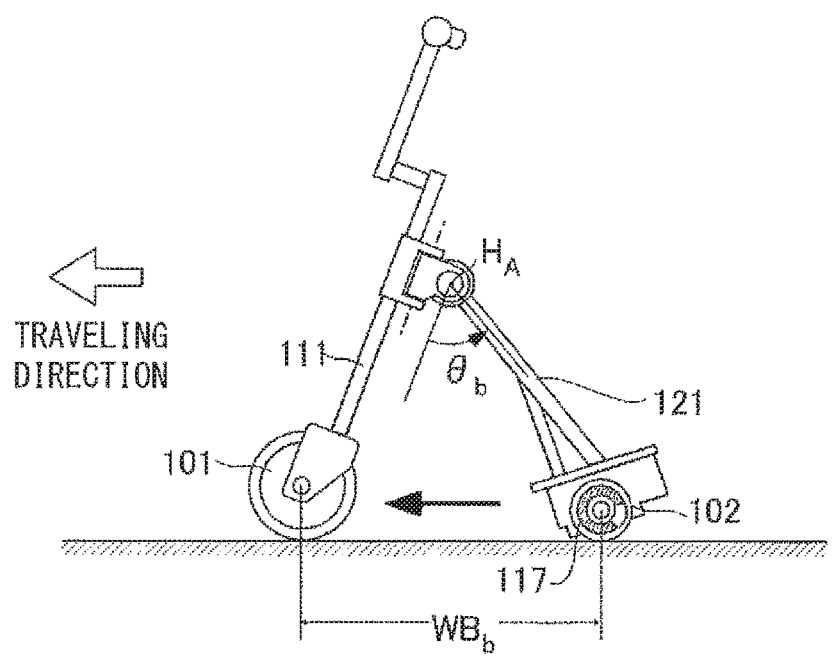

FIGS. 8A and 8B are drawings for describing a behavior of the traveling apparatus 100 when a failure occurs. FIG. 8A shows a state immediately after a failure is detected while the traveling apparatus 100 is traveling. FIG. 8B shows a state after a certain period of time has elapsed since failure control started.

In the traveling apparatus 100, the front wheel 101 and rear wheels 102 are aligned with respect to the traveling direction. The traveling apparatus 100 travels while the user 900 is balancing on the step 141. That is, the user 900 who is an occupant is not stably seated on the traveling apparatus 100. Therefore, a sudden braking in the event of a failure could cause a situation that makes the user 900 fall forward and jump off the traveling apparatus 100.

As described above, the speed of the traveling apparatus 100 is controlled so as to follow the target speed associated with the WB length (rotation angle θ). Therefore, when the control unit 200 continues the speed control even in the event of a failure, in order to stop the traveling apparatus 100, the user 900 needs to reduce the WB length or prepare an adjusting mechanism using an actuator to forcibly reduce the WB length. On the other hand, taking into consideration that it is desirable to stop the traveling apparatus 100 as promptly as possible in the event of a failure, inertia acting on the user 900 at the time of deceleration becomes greater than that at the time of normal deceleration, and when the WB length is short, it is difficult for the user 900 to maintain his/her balance on the step 141.

Therefore, when the failure detection unit 201 detects a failure, the control unit 200 stops the control based on the target speed associated with the WB length, stops supplying the driving signal to the driving wheel unit 210, and performs control to extend the WB length. At this time, in the control to extend the WB length, the control unit 200 controls the disc brake 117 as a rear wheel braking member to brake the rotation of the rear wheels 102.

When the failure detection unit 201 detects a failure in the state shown in FIG. 8A, the control unit 200 stops supplying the driving signal to the driving wheel unit 210. Then, the rotation of the motor (not shown) is stopped, and thus the traveling apparatus 100 starts decelerating. At this time, the rotation angle θ is $θ_a$, and the WB length is $WB_a$. As a method of stopping the rotation of the motor, in addition to stopping the supply of the driving signal, the control unit 200 may stop supplying power to the motor.

The control unit 200 stops supplying the driving signal and sends the brake signal to the disk brake 117 in order to reduce the rotation speed of the rear wheels 102. It is preferable that a braking force of the disc brake 117 at this time be adjusted according to the speed as of this time so that the user 900 does not lose his/her balance.

When the braking of the rear wheels 102 is started, as shown in FIG. 8B, the WB length is naturally extended. That is, although a rotational speed of the rear wheels 102 is reduced as soon as the braking of the disk brake 117 is started, the front wheel 101 tries to rotate because of inertia, so that the front pole 111 and rear pole 121 are rotated in relation to each other around the hinge axis $H_A$ ($θ_a→θ_b$) and the WB length is extended ($WB_a→WB_b$). If the WB length can be kept long when the speed of the traveling apparatus 100 is reduced in a short time, the user 900 can easily maintain his/her balance on the step 141.

Figure 9:
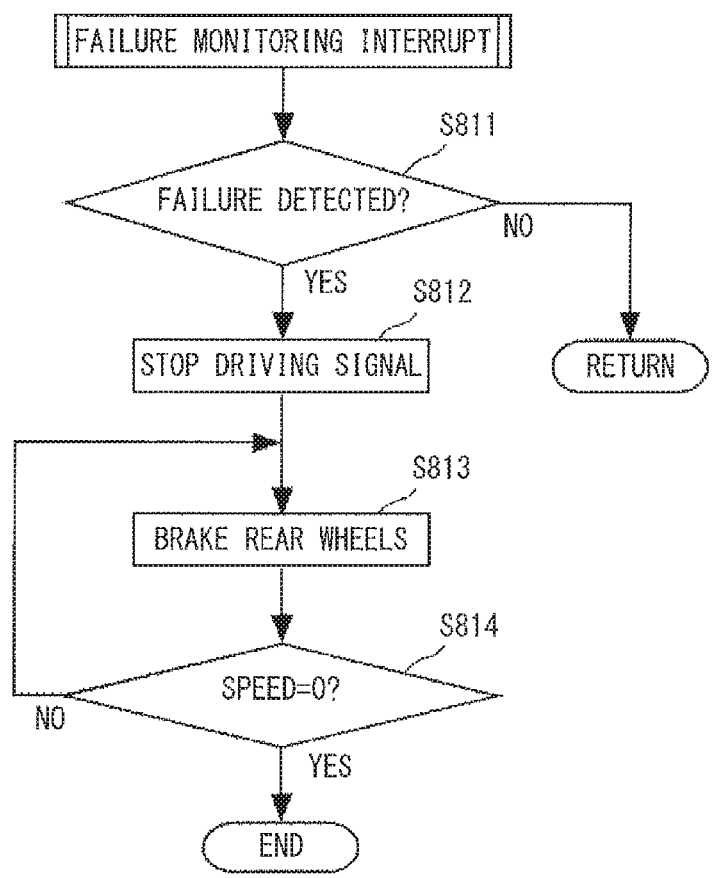
FIG. 9 is a flowchart of a failure monitoring interrupt process.

FIG. 9 is a flowchart of a failure monitoring interrupt process for periodically monitoring whether or not a failure has occurred. As described above, the failure monitoring interrupt process is executed as an interrupt process at regular intervals during the execution of the flow shown in FIG. 7.

In the failure monitoring interrupt process, firstly in Step S811, the failure detection unit 201 analyzes the information obtained from the vehicle speed sensor 220, rotation angle sensor 134, various sensors 235, and load sensor 240 and checks whether there is a failure. If a failure is not detected, the process returns to the step which is currently being processed in the flow shown in FIG. 7. If a failure is detected, the process proceeds to Step S812.

In Step S812, the control unit 200 stops the speed control based on the target speed associated with the WB length and stops supplying the driving signal to the driving wheel unit 210. Then, the control unit 200 sends the brake signal to the disc brake 117 to brake the rotation of the rear wheels 102 (Step S813).

In Step S814, the control unit 200 receives the speed signal from the vehicle speed sensor 220, and checks whether or not the speed of the traveling apparatus 100 is zero, i.e., whether or not the traveling apparatus 100 has stopped. If the traveling apparatus 100 has not stopped yet, the control unit 200 returns to Step S813. If the traveling apparatus 100 has stopped, the control unit 200 controls the battery to stop outputting power, and the series of operations is ended.

Figure 10:
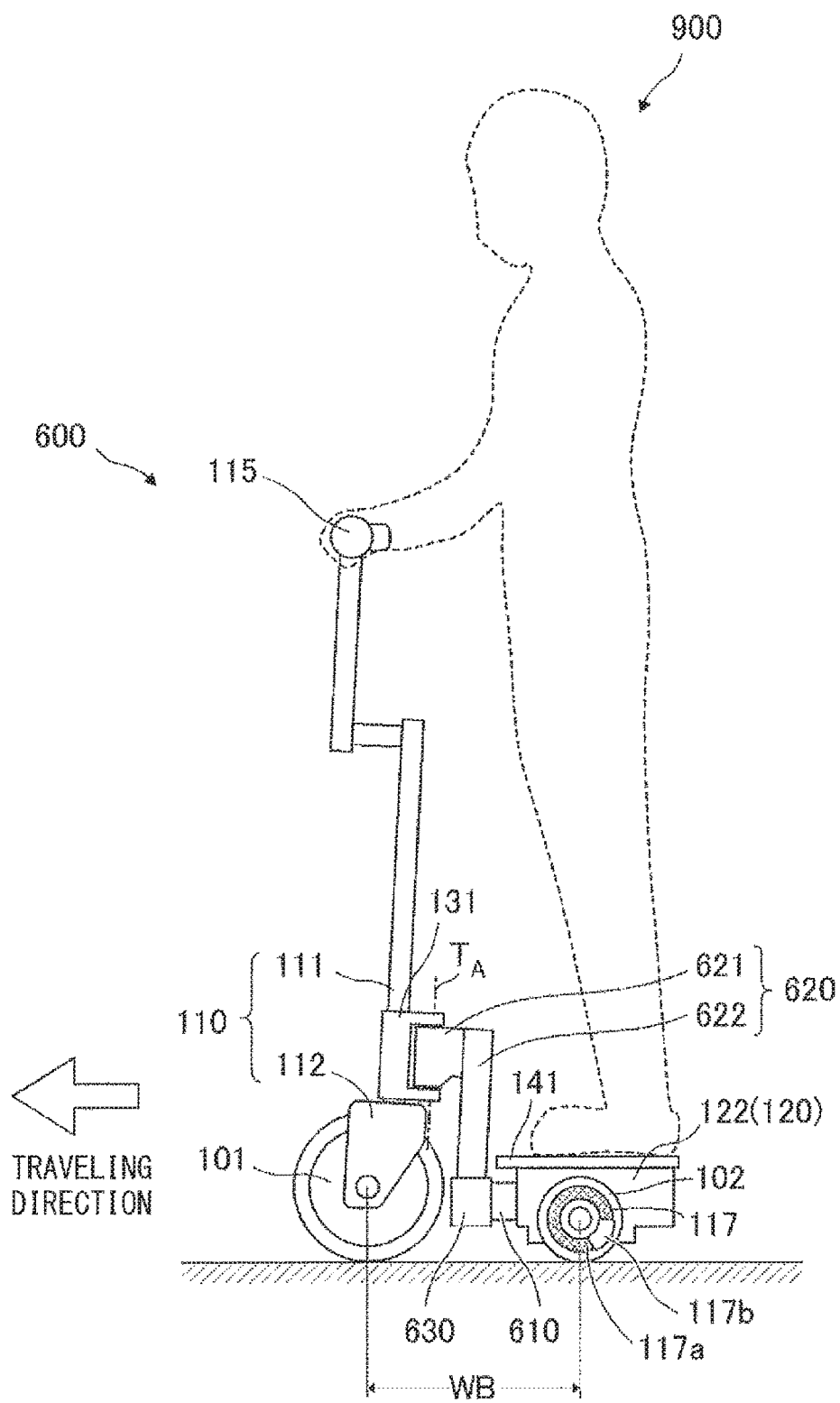
FIG. 10 is a lateral overview diagram of a traveling apparatus according to a second embodiment when it travels at a low speed.
Figure 11:
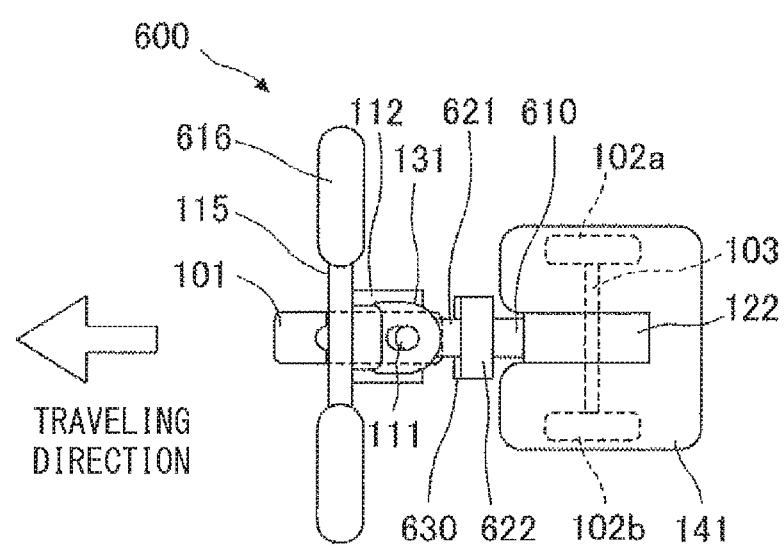
FIG. 11 is a top overview diagram of the traveling apparatus.

Next, a second embodiment will be described. FIG. 10 is a lateral overview diagram of a traveling apparatus 600 according to the second embodiment when it travels at a low speed. FIG. 11 is a top lateral diagram view from above the traveling apparatus 600 that is in the state shown in FIG. 10. In FIG. 11, a user 900, who is illustrated by the dotted line in FIG. 10, is not shown. Like the traveling apparatus 100 of the first embodiment, the traveling apparatus 600 is one kind of personal mobility vehicle and is a motorized mobile vehicle in which a user stands when he or she rides on the traveling apparatus 600. The elements of the traveling apparatus 600 serving the same function as those of the traveling apparatus 100 are denoted by the same reference signs as those in the first embodiment. The descriptions of such elements will be thus omitted in this example.

The traveling apparatus 100 of the first embodiment employs a mechanism in which the front wheel supporting member 110 is connected to the rear wheel supporting member 120 with the hinge joint 132 interposed therebetween in such a way as to rotate the front wheel 101 and rear wheels 102 in relation to each other, as a mechanism to adjust the WB length between the front wheel 101 and rear wheels 102. Further, the user 900 tilts the handlebar 115 forward or backward to exert his/her force in order to adjust the WB length. The traveling apparatus 600 of the second embodiment employs, as an adjusting mechanism to adjust the WB length between the front wheel 101 and rear wheels 102, a mechanism to extend and retract an extensible rod 610, which is disposed between the front wheel supporting member 110 and the body part 122 that serves as a rear wheel supporting member. The extensible rod 610 is extended or retracted when an actuator (not shown) is driven by a control signal from the control unit 200.

The extensible rod 610 is composed of a plurality of hollow coupling rods with diameters different from one another arranged in a nested manner and is structured to displace the coupling rods from the retracted state to the extended state or from the extended state to the retracted state. Thus, the control unit 200 can increase or reduce the WB length in a phased manner according to the number of the coupling rods.

The pivot joint 131 is fixed to the front pole 111 that constitutes the front wheel supporting member 110 at a position near to the other end of the front pole 111 to which the fork 112 is fixed. Moreover, the pivot joint 131 is pivotally arranged on a bearing part 621 that constitute a coupler 620 and rotates around a pivot axis $T_A$ that is disposed parallel to the direction in which the front pole 111 extends in relation to the bearing part 621. The coupler 620 further includes a connecting part 622 in addition to the bearing part 621. The bearing part 621 and connecting part 622 are integrally formed. The connecting part 622 is a pillared member that is extended almost in parallel to the front pole 111 and supports a housing box 630 at an end thereof opposite to the other end thereof where the bearing part 621 is disposed.

The housing box 630 fixes and supports a leading end of the narrowest coupling rod among the coupling rods that constitute the extensible rod 610 and also accommodates the extensible rod 610 in such a way that at least a part of outer peripheral surfaces of the coupling rods, which are nested when they are retracted, are covered. A rear end of the thickest coupling rod among the coupling rods that constitute the extensible rod 610 is fixed to and supported by the body part 122.

In the traveling apparatus 600, a right grip constituting the handlebar 115 is included as an operation grip 616 for extending and retracting the extensible rod 610. The operation grip 616 can rotate forwardly and backwardly around an axis in a direction in which the handlebar 115 is extended. When the user 900 rotates the operation grip 616 forward, an extension signal is sent to the control unit 200, while when the user 900 rotates the operation grip 616 backward, a retraction signal is sent to the control unit 200.

Figure 12:
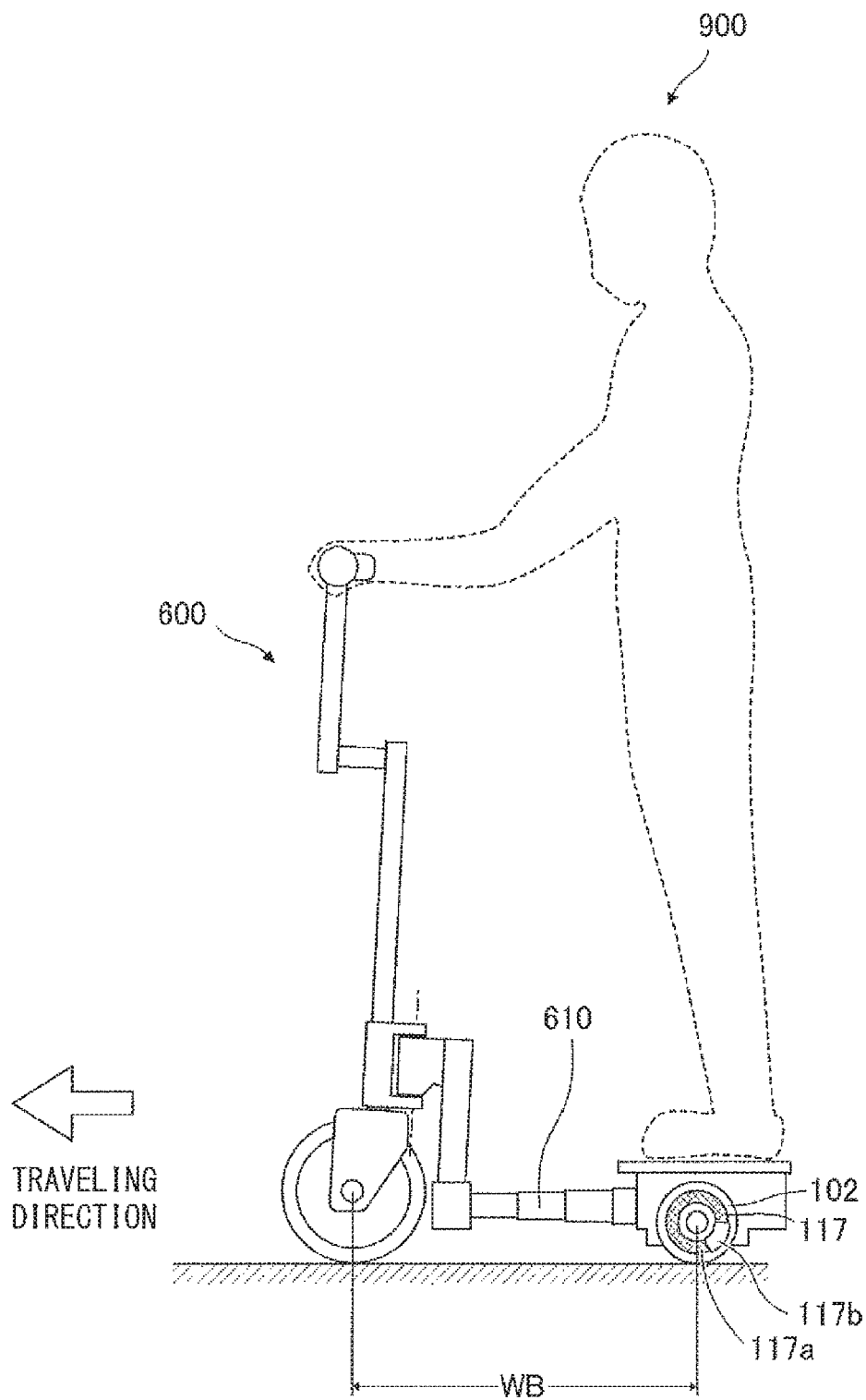
FIG. 12 is a lateral overview diagram of the traveling apparatus when it travels at a high speed.

During the normal traveling, the traveling apparatus 600 receives a command for extending or retracting the extensible rod 610 from the user via the operation grip 616 and adjusts the WB length. Then, the traveling apparatus 600 adjusts the speed to follow the target speed associated with the adjusted WB length. FIG. 12 is a lateral overview diagram of the traveling apparatus 600 shown in FIG. 10 with a long WB length while it is traveling at a high speed.

With such a configuration, the WB length will become short when the traveling apparatus 600 travels at a low speed, and thus the traveling apparatus 600 is maneuverable. That is, the traveling apparatus 600 can move around in a small space. On the contrary, the WB length becomes longer while the traveling apparatus 600 is traveling at a high speed, thereby improving travel stability, in particular, straight drivability. That is, the traveling apparatus 600 is less susceptible to sway caused by bumps and the like on the road even when traveling at a high speed. As the WB length is changed in conjunction with a change in the speed, the WB length will not be long when the traveling apparatus 600 is traveling at a low speed, and thus the traveling apparatus 600 can move in a projected area minimal at the speed. That is, an area on the road necessary for the traveling apparatus 600 to travel in is small without requiring an excess area. As the user 900 can change both the WB length and speed in conjunction with each other when he or she rotates the operation grip 616 forward or backward, the driving operation is easy and simple.

Also in the traveling apparatus 600 with the above-described configuration, speed control similar to that in the first embodiment can be performed during the normal traveling. Specifically, the conversion table for associating the target speed with the rotation angle θ described in the first embodiment may be replaced with the conversion table for associating the target speed with the WB length in the traveling apparatus 600. Further, the process for detecting the rotation angle θ and setting the target speed in the first embodiment may be replaced with the process for detecting the WB length and setting the target speed in the traveling apparatus 600.

Figure 13:
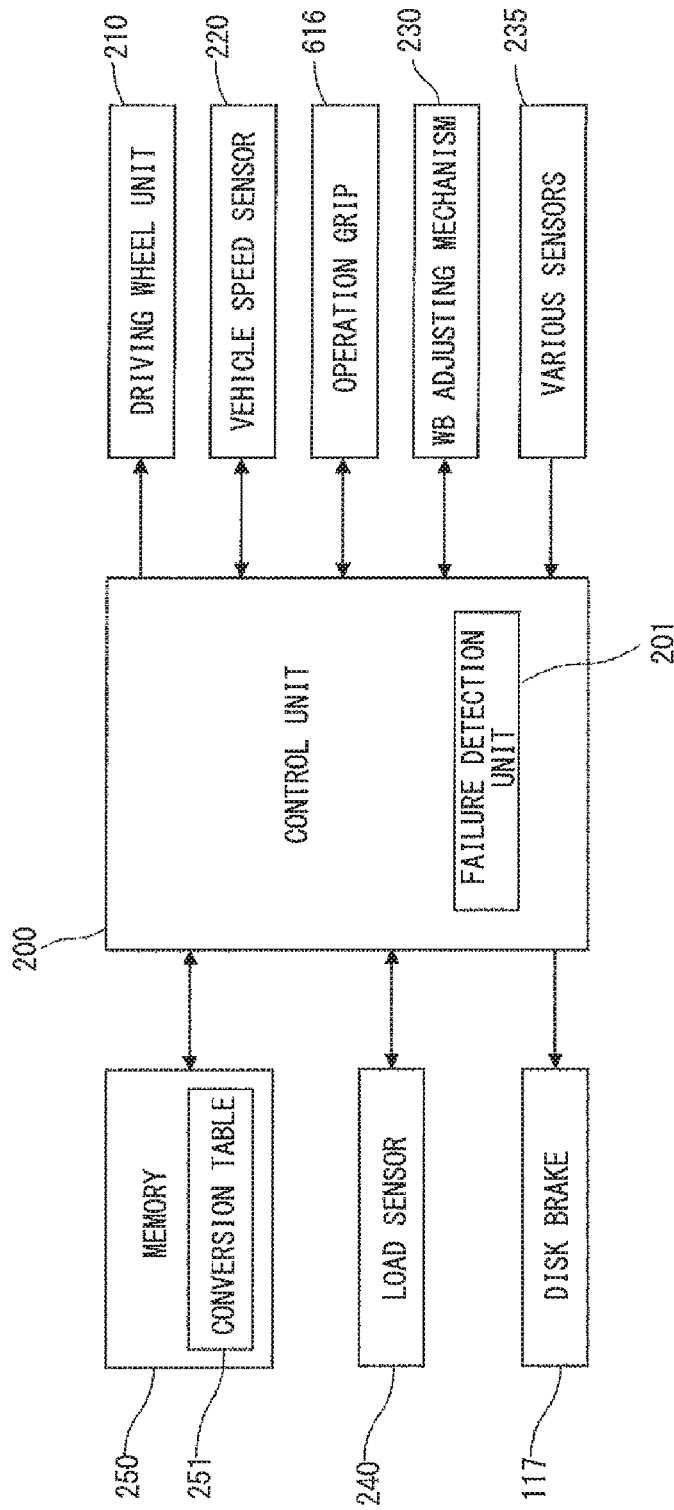
FIG. 13 is a control block diagram of the traveling apparatus.

FIG. 13 is a control block diagram of the traveling apparatus 600. The elements of the traveling apparatus 600 serving the same function as those of the traveling apparatus 100 are denoted by the same reference signs as those in the first embodiment. The descriptions of such elements will be thus omitted in this example.

As described above, when the operation grip 616 detects forward rotation, it sends the extension signal to the control unit 200, while when the operation grip 616 detects backward rotation, it sends the retraction signal to the control unit 200. The operation grip 616 may detect an amount of the rotation of the operation grip 616 to change an amount of extension/retraction per unit time.

A WB adjusting mechanism 230 includes the extensible rod 610 and a driving circuit and an actuator for extending and retracting the extensible rod 610. The WB adjusting mechanism 230 functions as an extension driving unit for extending the WB length by driving a force of the actuator. The control unit 200 sends the extension/retraction signal to the WB adjusting mechanism 230 to thereby execute control to extend and retract the extensible rod 610.

Figure 14:
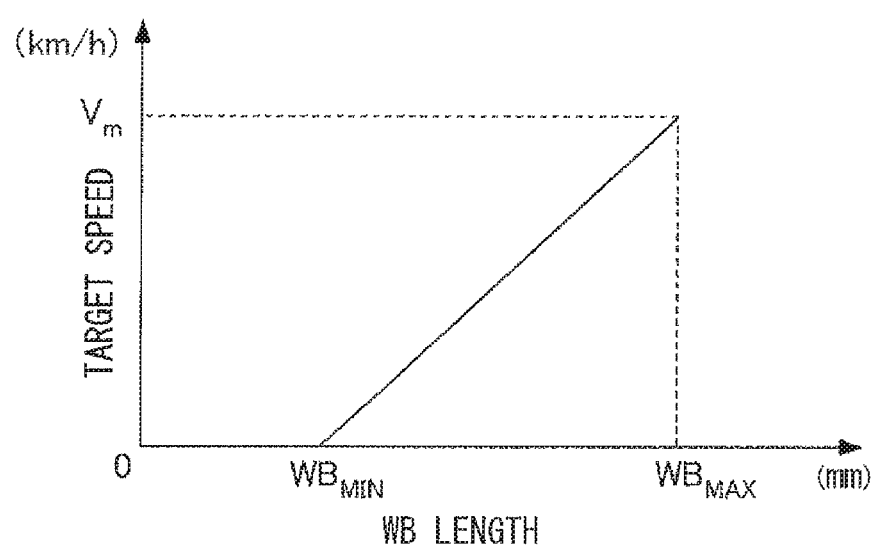
FIG. 14 is a graph showing a relationship between a WB length and a target speed.

FIG. 14 is a graph showing a relationship between the WB length and target speed when the speed control for making the traveling apparatus 600 follow the target speed associated with the WB length is performed. As shown in FIG. 14, the target speed is expressed as a linear function of the WB length. The target speed is configured to be increased as the WB length increases. The target speed is zero at the minimum WB length $WB_{MIN}$ (mm), and the target speed is $V_m$ (km/h) at the maximum WB length $WB_{MAX}$ (mm). This relationship is stored in the memory 250 as the conversion table 251 for converting the WB length into the target speed.

Further, as in the example described with reference to FIG. 6 in the first embodiment, the conversion table 251 may employ the lookup table format where the continuously varying WB length is divided into a plurality of groups, and one target speed is associated with each group. As another example from among various examples of the association between the WB length and target speed, the amount of a change in the target speed for the amount of a change in the WB length may be configured to be small in a low-speed region, while the amount of a change in the target speed for the amount of a change in the WB length may be configured to be large in a high-speed region.

Figure 15:
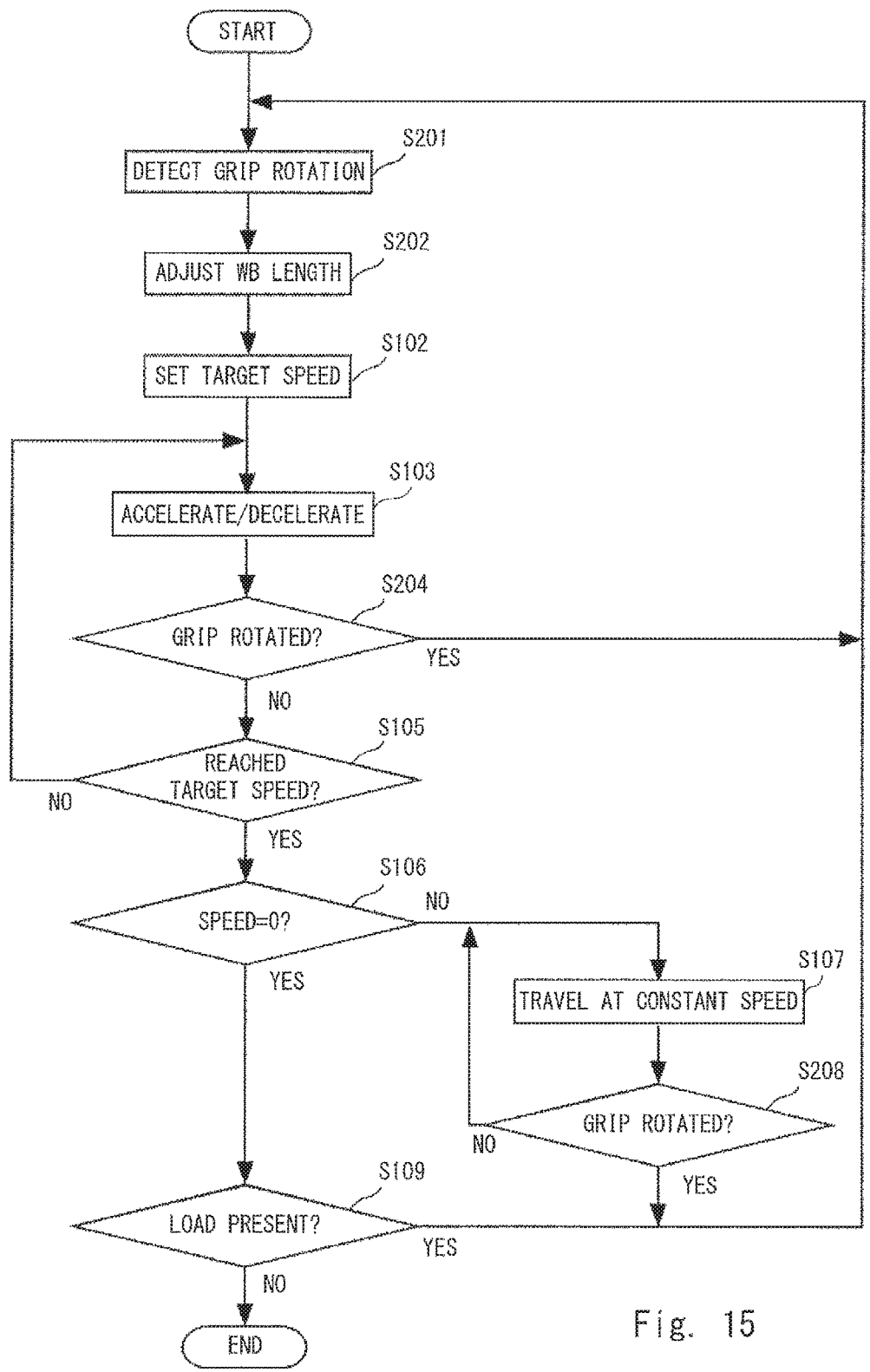
FIG. 15 is a flowchart showing a process while the traveling apparatus is normally traveling.

Next, a process during the normal traveling according to this embodiment will be described. FIG. 15 is a flowchart showing a process performed while the traveling apparatus 600 is normally traveling. The flow starts when a power switch is turned on and a signal indicating that a load is present is received from the load sensor 240, i.e., when the user 900 rides on the traveling apparatus 600. The process equivalent to the process in FIG. 7 is denoted by the same step number as that in FIG. 7.

In Step S201, the control unit 200 detects rotation of the operation grip 616 and receives the extension or retraction signal. Then, in Step S202, the control unit 200 sends the extension/retraction signal to the WB adjusting mechanism 230 according to the received extraction or retraction signal to adjust the WB length. The control unit 200 proceeds to Step S102 and applies the adjusted WB length to the conversion table 251, which has been read out from the memory 250, to set the target speed.

When the control unit 200 sets the target speed, it proceeds to Step S103 and sends a driving signal for acceleration or deceleration to the driving wheel unit 210. Specifically, the control unit 200 firstly receives the speed signal from the vehicle speed sensor 220 and checks the current speed. If the target speed is greater than the current speed, the control unit 200 sends the driving signal for acceleration to the driving wheel unit 210, whereas if the target speed is less than the current speed, the control unit 200 sends the driving signal for deceleration to the driving wheel unit 210.

The control unit 200 monitors whether or not the operation grip 616 has been rotated during acceleration or deceleration (Step S204). If the control unit 200 determines that the operation grip 616 has been rotated, it starts the process from Step S201 again. If the control unit 200 determines that the operation grip 616 has not been rotated, it proceeds to Step S105.

In Step S105, the control unit 200 receives the speed signal from the vehicle speed sensor 220 and evaluates as to whether or not the current speed has reached the target speed. If the control unit 200 determines that the current speed has not reached the target speed, it returns to Step S103, and the acceleration or deceleration is continued. If the control unit 200 determines that the current speed has reached the target speed, it proceeds to Step S106. In Step S106, the control unit 200 checks whether or not the target speed is zero. If the target speed is zero, it means that the traveling apparatus 600 is stopped at the time of Step S106. In this case, the control unit proceeds to Step S109. Otherwise, the traveling apparatus 600 is traveling at the target speed, and thus the control unit 200 sends, to the driving wheel unit 210, the driving signal for maintaining the traveling apparatus 600 to travel at the speed (Step S107).

Even while the traveling apparatus 600 is traveling at a constant speed in Step S107, the control unit 200 monitors whether or not the operation grip 616 has been rotated (Step S208). If the control unit 200 determines that the operation grip 616 has been rotated, it returns to Step S201. If the control unit 200 determines that the operation grip 616 has not been rotated, it returns to Step S107 to continue traveling at the constant speed.

If the control unit 200 confirms that the target speed is zero in Step S106, the control unit 200 proceeds to Step S109 and evaluates whether the user 900 gets off the traveling apparatus 600 based on the load signal received from the load sensor 240. If the control unit 200 determines that the user 900 has not got off the traveling apparatus 600, i.e., determines that a load is present, it returns to Step S201 to continue the travel control. If the control unit 200 determines that the user 900 has got off the traveling apparatus 100, the series of operations is ended.

Like the traveling apparatus 100 of the first embodiment, the traveling apparatus 600 of this embodiment executes an interrupt process for periodically monitoring whether or not a failure has occurred during the normal traveling. When a failure is detected, failure control for promptly and safely stopping the traveling apparatus 600 is executed. Like in the first embodiment, in this embodiment, when the failure detection unit 201 detects a failure, the control unit 200 stops the control based on the target speed associated with the WB length, stops supplying the driving signal to the driving wheel unit 210, and performs control to extend the WB length. In this embodiment, however, in the control for extending the WB length, the control unit 200 sends the extension signal to the WB adjustment mechanism 230 in order to extend the extensible rod 610 in a more direct manner as compared with that of the first embodiment.

Figure 16:
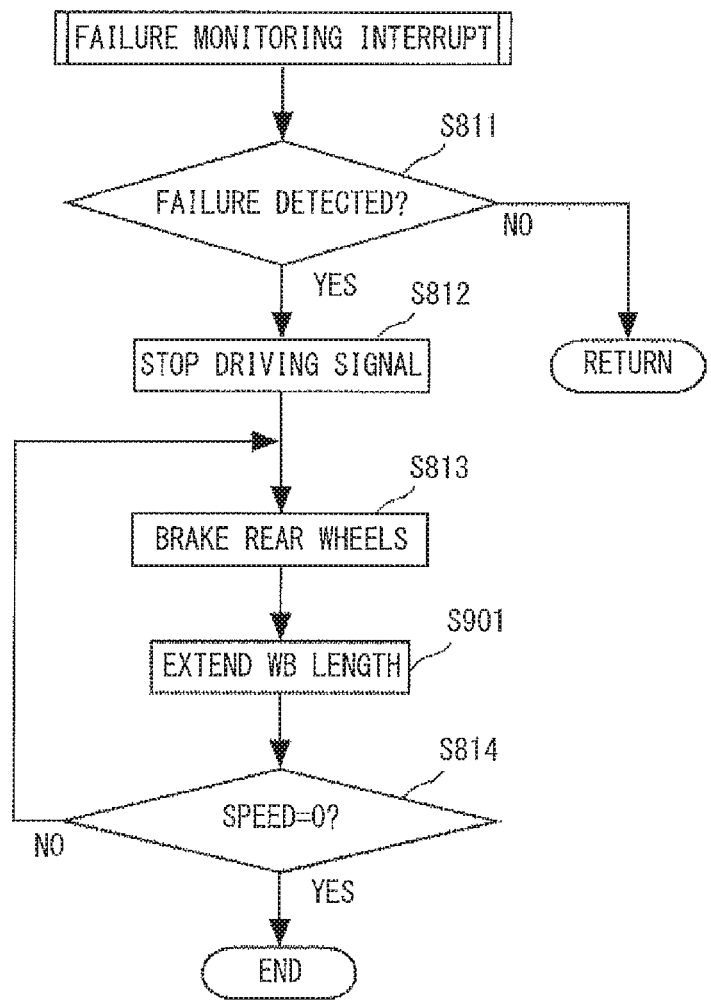
FIG. 16 is a flowchart of a failure monitoring interrupt process.

FIG. 16 is a flowchart of a failure monitoring interrupt process for periodically monitoring whether or not a failure has occurred. The failure monitoring interrupt process is executed as an interrupt process at regular intervals during the execution of the flow shown in FIG. 15. The process equivalent to the process in FIG. 9 is denoted by the same step number as that in FIG. 9.

In the failure monitoring interrupt process, firstly in Step S811, the failure detection unit 201 analyzes the information obtained from the vehicle speed sensor 220, rotation angle sensor 134, various sensors 235, and load sensor 240 and checks whether or not there is a failure. If a failure is not detected, the process returns to the step which is currently being processed in the flow shown in FIG. 16. If a failure is detected, the process proceeds to Step S812.

In Step S812, the control unit 200 stops the speed control based on the target speed associated with the WB length and stops supplying the driving signal to the driving wheel unit 210. Then, the control unit 200 sends the brake signal to the disc brake 117 to brake the rotation of the rear wheels 102 (Step S813). In this embodiment, the role of the disc brake 117 is to merely reduce the speed promptly. The control unit 200 proceeds to Step S901 and sends the extension signal to the WB adjustment mechanism 230 to extend the extension rod 610.

In Step S814, the control unit 200 receives the rotation angle signal from the rotation angle sensor 134, and checks whether or not the speed of the traveling apparatus 600 is zero, i.e., whether or not the traveling apparatus 600 has stopped. If the control unit 200 determines that the traveling apparatus 600 has not stopped yet, the control unit 200 returns to Step S813 to continue Steps S813 and S901. However, if the extensible rod 610 is extended to its longest length, Step S901 is skipped. If the control unit 200 determines that the traveling apparatus 600 has stopped in Step S814, it controls the battery to stop outputting power, and the series of operations is ended.

By such control of the second embodiment, the speed of the traveling apparatus 600 can be reduced in a short time and the WB length can be increased, and thus it is possible to stop the traveling apparatus 600 promptly and safely in the event of a failure. Also in this embodiment, as a method of stopping the rotation of the motor, power supply to the motor may be stopped.

Although the first and second embodiments above describe that, when a failure is detected, the supply of the driving signal to the driving wheel unit 210 by the control unit 200 is stopped, the control unit 200 may instead continue to supply the driving signal to the driving wheel unit 210 so that the speed is gradually reduced. If the speed is gradually reduced, it is easier for the user 900 to maintain his/her balance on the step 141.

Moreover, the control for extending the WB length may employ various other methods of control than braking the rear wheels 102 as in the first embodiment and extending the extensible rod 610 as in the second embodiment. For example, an elastic member may be provided between the front pole 111 and rear pole 121, where the elastic member is normally compressed by a locking part and when the locking part is unlocked, the elastic member extends the WB length. When a failure is detected, control may be performed to unlock the locking part by the actuator.

Although the embodiments have been described, the front and rear wheels may not be wheels and may instead be ground-contacting elements such as spherical wheels, a crawler, or the like. Moreover, a power source for driving the driving wheels is not limited to a motor and instead may be a gasoline engine or the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus including at least, with respect to a traveling direction, a front wheel and a rear wheel and on which a user rides when traveling, the traveling apparatus comprising:
   a front wheel supporting member configured to rotatably support the front wheel;
   a rear wheel supporting member configured to rotatably support the rear wheel;
   a driving unit configured to drive at least one of the front wheel and the rear wheel;
   an adjusting mechanism configured to adjust a wheel base length between the front wheel and the rear wheel by the user changing relative positions of the front wheel supporting member and the rear wheel supporting member;
   a control unit configured to control the driving unit based on a target speed associated with the wheel base length; and
   a failure detection unit configured to detect a failure in the traveling apparatus, wherein
   when the failure detection unit detects the failure, the control unit stops the control based on the target speed associated with the wheel base length and performs control to extend the wheel base length.

2. The traveling apparatus according to claim 1, wherein when the failure detection unit detects the failure, the control unit stops supplying power to the driving unit or stops supplying a driving signal to the driving unit.

3. The traveling apparatus according to claim 1, wherein when the failure detection unit detects the failure, the control unit controls the driving unit to gradually reduce a speed of the traveling apparatus.

4. The traveling apparatus according to claim 1, further comprising a rear wheel braking member configured to brake rotation of the rear wheel, wherein when the failure detection unit detects the failure, the control unit controls the rear wheel braking member to brake the rotation of the rear wheel in the control to extend the wheel base length.

5. The traveling apparatus according to claim 1, wherein
the adjusting mechanism comprises an extension driving unit that extends the wheel base length by driving a force of an actuator, and
when the failure detection unit detects the failure, the control unit controls the extension driving unit to extend the wheel base length in the control to extend the wheel base length.

6. The traveling apparatus according to claim 1, further comprising an elastic member disposed between the front wheel supporting member and the rear wheel supporting member and configured to extend the wheel base length when an locking part is unlocked, wherein when the failure detection unit detects the failure, the control unit unlocks the locking part of the elastic member in the control to extend the wheel base length.

7. The traveling apparatus according to claim 1, wherein the target speed is associated with the wheel base length in such a way that the greater the wheel base length, the greater the target speed becomes.

* * * * *